United States Patent [19]

Aoshima et al.

[11] Patent Number: 4,792,627
[45] Date of Patent: Dec. 20, 1988

[54] PROCESS FOR PRODUCING POLYETHER POLYOL AND A PRODUCT

[75] Inventors: Atsushi Aoshima, Yokohama; Shoichiro Tonomura, Fuji; Hiroyuki Fukui, Fuji; Hisaya Imai, Fuji, all of Japan

[73] Assignee: Asahi Kasei Kogyo Kabushiki Kaisha, Osaka, Japan

[21] Appl. No.: 944,354

[22] Filed: Dec. 22, 1986

Related U.S. Application Data

[63] Continuation of Ser. No. 716,656, Mar. 27, 1985.

[30] Foreign Application Priority Data

| Mar. 28, 1984 | [JP] | Japan | 59-58485 |
| Nov. 16, 1984 | [JP] | Japan | 59-240481 |
| Nov. 21, 1984 | [JP] | Japan | 59-244340 |
| Nov. 21, 1984 | [JP] | Japan | 59-244345 |
| Mar. 8, 1985 | [JP] | Japan | 60-44679 |

[51] Int. Cl.$^4$ .................... C07C 85/24; C07C 87/20
[52] U.S. Cl. .................... 564/487; 564/505; 568/45; 568/617; 528/417
[58] Field of Search .................. 564/487, 505; 568/45, 568/617; 528/417

[56] References Cited

U.S. PATENT DOCUMENTS

| 4,202,964 | 5/1980 | Pruckmayr et al. | 568/617 |
| 4,374,970 | 2/1983 | Robinson | 568/617 |
| 4,393,199 | 7/1983 | Manser | 528/417 |
| 4,481,123 | 11/1984 | Heutschel et al. | 568/617 |
| 4,568,775 | 2/1986 | Aoshima et al. | 568/617 |
| 4,658,065 | 4/1987 | Aoshima et al. | 564/487 |

FOREIGN PATENT DOCUMENTS

| 0126471 | 11/1984 | European Pat. Off. |  |
| 58-83028 | 5/1983 | Japan | 568/617 |

*Primary Examiner*—Glennon H. Hollrah
*Assistant Examiner*—John A. Sopp
*Attorney, Agent, or Firm*—Finnegan, Henderson, Farabow, Garrett & Dunner

[57] ABSTRACT

A process for producing a polyether polyol with a content of 0.5 to 99.5% by weight of oxytetramethylene groups derived from tetrahydrofuran by copolymerizing tetrahydrofuran or a mixture of tetrahydrofuran and other cyclic ether copolymerizable therewith with a polyhydric alcohol having two or more hydroxyl groups per one molecule with the use of a heteropolyacid and/or its salt as a catalyst, which comprises allowing 0.1 to 15 molecules of water per one heteropolyanion to exist in the catalyst phase.

The above-described polyether polyol is an industrially useful polymer which is a starting material for polyurethane to be used for spandex or a synthetic leather, etc.

7 Claims, 5 Drawing Sheets

4,792,627

PROCESS FOR PRODUCING POLYETHER POLYOL AND A PRODUCT

This is a continuation of application Ser. No. 716,656, filed Mar. 27, 1985.

TECHNICAL FIELD

The present invention relates to a process for producing a polyether polyol, which comprises copolymerizing a polyhydric alcohol having two or more hydroxyl groups in one molecule with tetrahydrofuran (hereinafter sometimes abbreviated as "THF"), or a polyhydric alcohol with tetrahydrofuran and a cyclic ether copolymerizable therewith by using a heteropoly acid and/or its salt as a catalyst, and also to a novel polyether polyol.

BACKGROUND ART

For a polyether glycol, which is a starting material for a polyurethane, to be used for spandex or a synthetic leather, polyoxytetramethylene glycol (hereinafter abbreviated as "PTMG"), which is a homopolymer of THF, has primarily been used. However, the soft segments of the urethane elastomer employing PTMG are liable to be crystallized at lower temperatures causing problems in physical properties such that recovery after being elongated under stress is not sufficient.

As one method for solving this problem, investigations have been made with copolymers of THF and cyclic ethers as a substitute of polyether glycols for PTMG. However, due to difficulty in ring opening polymerizability of a cyclic ether or in a synthesis of a cyclic ether, only limited species of copolymers are available and therefore no satisfactory result has yet been obtained.

In addition, ring-opening polymerizability of THF is low generally, and heretofore production of a copolymer having hydroxyl groups at both terminal ends by copolymerizing THF with a polyhydric alcohol co-presented therewith was unknown. It had only been known that epichlorohydrin, which is high in ring-opening characteristic, is allowed to co-exist with THF (see Japanese Patent Publication after examination No. 32200/1973). However, the polyhydric alcohols added in this method may be considered to act only for an initiation of the reaction, and therefore they are bonded only to one terminal end of the polymer.

The present inventors have made extensive studies to overcome the problems described above aand consequently discovered a catalyst which is capable of synthesizing a polyether glycol by copolymerizing a diol with THF to accomplish the present invention.

DISCLOSURE

Figure 1:
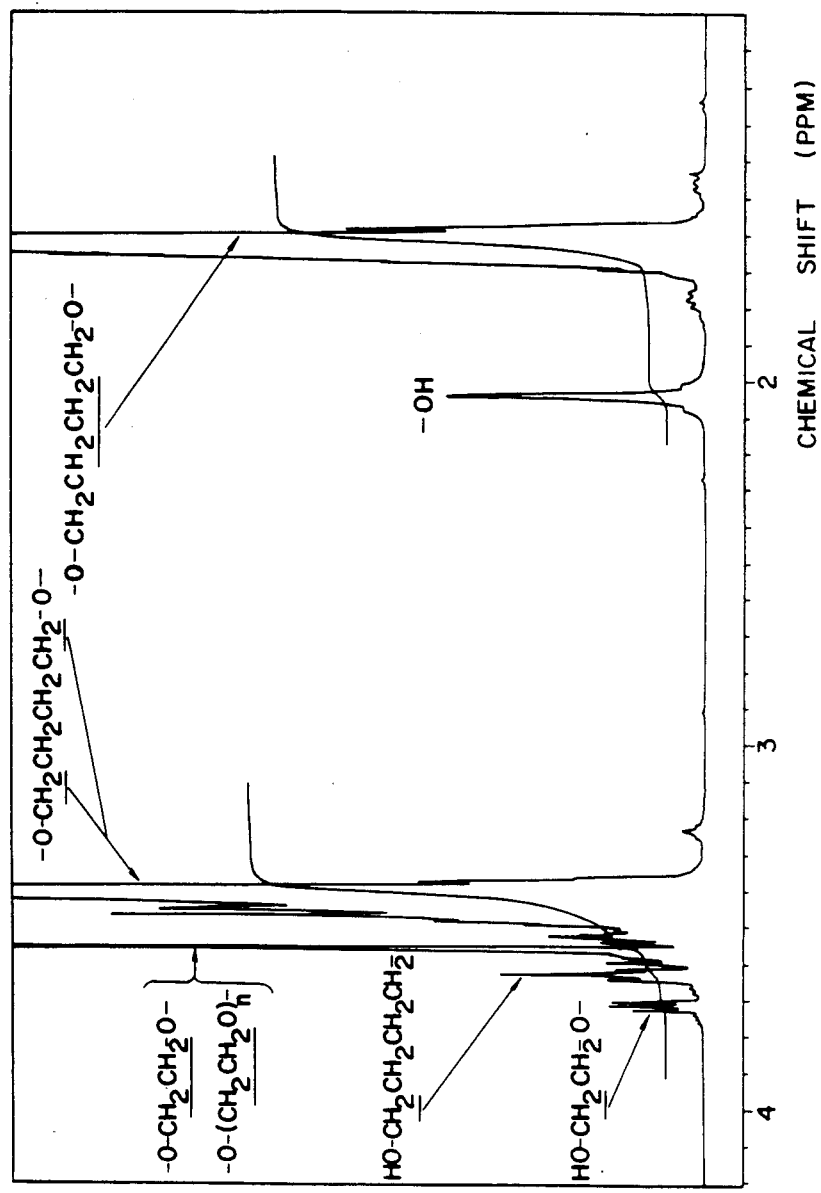
FIG. 1 shows $^1$H-NMR spectrum of a copolymerized polyether glycol of THF and ethylene glycol as described in Example 1 (measured at 400 MHz by means of JEOL JNM-GX 400 NMR device)

The present invention provides a process for producing a polyether polyol with a content of 0.5 to 99.5% by weight of oxytetramethylene groups derived from tetrahydrofuran by copolymerizing tetrahydrofuran with a polyhydric alcohol having two or more hydroxyl groups per one molecule or by copolymerizing a mixture of tetrahydrofuran and another cyclic ether copolymerizable therewith with a polyhydric alcohol having two or more hydroxyl groups per one molecule with the use of a heteropoly-acid and/or its salt as a catalyst, which comprises allowing 0.1 to 15 molecules of water per one heteropoly-anion to exist in the catalyst phase, and also provides a novel polyether glycol synthesized by the above process.

The present invention relates to a new reaction, wherein copolymerization proceeds only with THF and a polyhydric alcohol, and the polyhydric alcohol residue in the resultant polyetherglycol is not limited to the ends of molecule but can also be contained within the molecule. Further, in the present invention, water is not required to be added as a starting material in the reaction system, and no hydrolysis with addition of water is required to be conducted after the reaction, but the terminal ends can directly be converted to OH groups. In addition, the catalyst can be recycled for reuse. Thus, the present invention possesses new specific features which had not been realized in the prior art.

Such a polymerization as described above has surprisingly been accomplished for the first time by using a heteropoly-acid as a catalyst and allowing 0.1 to 15 molecules of water per one heteropoly-anion to exist in the catalyst phase.

Generally, in the copolymerization reaction of THF and a cyclic ether known in the art, in addition to the disadvantage of limited species of cyclic ethers which can be adopted, polymerization is liable to proceed as a block polymerization due to the difference in polymerization reactivity between THF and the cyclic ether, causing difficulty in producing a polyetherglycol low in crystallinity, which is preferable as a soft segment for an elastomer. For example, tetrahydropyran which is a 6-membered cyclic ether cannot be copolymerized, and oxepane which is a 7-membered cyclic ether is also known to be very low in copolymerizability with THF. On the contrary, the reactivities of 3-membered or 4-membered cyclic ethers such as ethylene oxide or oxetane are extremely large as compared with THF, and therefore products in which ethylene oxide or oxetane are subjected to block polymerization are liable to be obtained.

Whereas, according to the process of the present invention, various kinds of polyhydric alcohols can be used as a comonomer with THF, and a copolymer can be obtained in which the comonomer is incorporated randomly in the polymeric chain. Most of these copolymers have lower melting points than PTMG having the same molecular weight are lower in crystallinity, and can be expected to exhibit excellent elastic recovery even at lower temperatures, when utilized as soft segments for an elastomer.

Any alcohol having two or more hydroxyl groups in one molecule may be used in the present invention, any alcohol may be available, provided that it has no substituent which interferes with the activity of the catalyst of the present invention. Preferable polyhydric alcohols may include dihydroxyalkanes such as ethylene glycol, propylene glycol, 1,3-propane diol, 1,4-butane diol, 1,3-butane diol, 2-methyl-1,3-propane diol, 1,5-pentane diol, 1,6-hexane diol, neopentyl glycol, 2-methyl-1,4-butane diol, hexane diol, heptane diol and the like; trihydroxyalkanes such as trihydroxyheptane, trihydroxyoctane, glycerine and the like; polyalkylene glycols such as diethylene glycol, triethylene glycol, tetraethylene glycol., dipropylene glycol and the like. Among the polyhydric alcohols mentioned above, dihydric alcohols are particularly preferred.

As the polyhydric alcohol, low molecular weight polymers of the polyether polyol derived by the process of the present invention using the polyhydric alcohol as exemplified above can also be used. Further, low molecular weight polymers of PTMG may be used as a part of the polyhydric alcohol. The low molecular weight polymer as herein mentioned is not particularly limited, so long as it has a molecular weight lower than the polymer to be synthesized, but for instance it should preferably have a number average molecular weight within the range of from 100 to 500, when a polymer having a number average molecular weight of 600 or higher is to be synthesized, and a number average molecular weight within the range of from 100 to 1,000 when a polymer having a number average molecular weight of 1,200 or more is to be synthesized. Recycling an oligomer separated by extraction or distillation from the polyether polyol synthesized according to the reaction of the present invention is a preferable example of using the above-dscribed low molecular weight polymer in the polymerization reaction. Such a low molecular weight polymer may be added preferably in an amount of 10 wt. % or less in the starting monomer.

By allowing a monohydric alcohol as the alcohol to exist in the reaction system, an alkoxy group can be introduced into the polymer at its terminal ends.

As an polyhyric alcohol, it is also possible to use a nitrogen containing polyhydric alcohol having a moiety comprising a secondary amine or a tertiary amine or a salt thereof in the molecule, and in this case a polymer containing nitrogen is obtained. The above nitrogen containing polyhydric alcohol is not particularly limited, but a compound having one hydroxyl group in each of the two substituents on the nitrogen atom is preferable, since it can give a polyetherglycol containing nitrogen atoms in the main chain, which can preferably be used as the starting material for elastomers. A preferable example of the nitrogen containing polyhydric alcohol has the following structural formula:

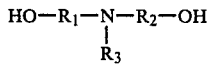

[wherein $R_1$ and $R_2$ are selected from the group consisting of —$(CH_2)_n$— (wherein n: 2-10), —$CH_2C-H_2$—O—$CH_2CH_2$— and —$CH_2CH_2C-H_2$—O—$CH_2CH_2CH_2$—, and $R_3$ is selected from the group consisting of hydrogen atom and alkyl groups having 1 to 10 carbon atoms] such as diethanolamine and N-methyl-diethanolamine.

Alternatively, the polyhydric alcohol may also be a polyhydroxysulfide having sulfur atoms in the molecule. In this case, a polymer containing sulfur is obtained. The polyhydroxysulfide is not particularly limited, and a preferable example is shown by the structural formula:

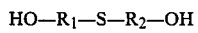

[wherein $R_1$ and $R_2$ are selected from the group consisting of —$(CH_2)_n$— (wherein n: 2-10), —$CH_2C-H_2$—O—$CH_2CH_2$— and —$CH_2CH_2C-H_2$—O—$CH_2CH_2CH_2$] such as 2,2'-thiodiethanolamine and 3,3'-thiodipropanolamine.

If the above nitrogen containing polyhydric alcohol or polyhydroxyalkylenesulfide exists in the reaction system in an amount of 4-fold moles of the heteropolyanion, polymerization activity will be lowered and hence, it is preferable to use the above compounds in an amount less than 4-fold moles of the heteropoly-anion.

The cyclic ether to be used in the present invention may include 3-membered cyclic ethers such as ethylene oxide, propylene oxide, isobutylene oxide, epichlorohydrin and the like; 4-membered cyclic ethers such as oxetane, 3,3-dimethyloxetane, 3-methyloxetane, 3,3-bis(chloromethyl)-oxetane and the like; 5-membered cyclic ethers such as methy tetrahydrofuran, 1,3-dioxorane and the like; 6-membered cyclic ethers such as trioxane and derivatives thereof; 7-membered cyclic ethers such as oxepane and derivatives thereof; bicyclic 5-membered ethers such as 1,4-epoxycyclohexane and the like; large cyclic ethers such as 15-crown-3,20-crown-4, etc.; and oligomeric cyclic ethers which are polymers of THF or copolymers of THF and alkylene oxide.

The composition of the starting materials for the process of the present invention is not particularly limited, but comprises preferably 0.5 to 99.9 wt. % of THF, more preferably 10 to 99 wt. %. When THF is copolymerized with both a polyhydric alcohol and a cyclic ether other than THF, the proportions of the polyhydric alcohol and the cyclic ether other than THF in the starting materials are not particularly limited, but the polyhydric alcohol may preferably be used in an amount of two-fold moles or more of the cyclic ether other than THF.

The heteropoly-acid and its salt in the present invention refers comprehensively to oxy acids formed by condensation of at least one oxide of Mo, W and V with oxy acids of other elements such as P, Si, As, Ge, B, Ti, Ce, Co, etc. and salts of the oxy acids, the atomic ratio of the former to the latter being 2.5 to 12.

Examples of these catalysts may include 12-molybdophosphoric acid, 5-molybdo-2-phosphoric acid, 12-tungstophosphoric acid, 12-molybdotungstophosphoric acid, 6-molybdo-6-tungstophosphoric acid, 12-molybdovanadophosphoric acid, 11-molybdo-1-vanadophosphoric acid, 12-molybdotungstovanadophosphoric acid, 12-tungstovanadophosphoric acid, 12-molybdoniobophosphoric acid, 12-tungstosilicic acid, 12-molybdosilicic acid, 12-molybdotungstosilicic acid, 12-molybdotungstovanadosilicic acid, 12-tungstoboric acid, 12- molybdoboric acid, 12-molybdotungstoboric acid, 12-molybdovanadoboric acid, 12-molybdotungstovanadoboric acid, 9-molybdonickelic acid, 6-molybdocobaltic acid, 6-tungstocobaltic acid, 11-molybdoarsenic acid, 12-tungstoarsenic acid, 12-tungstogermanic acid, 18-tungsto-2-arsenic acid, 18-molybdo-2-phosphoric acid, 9-molybdophosphoric acid, 18-tungsto-2-phosphoric acid, 12-titanomolybdic acid, 12-ceriomolybdic acid, 18-molybdo-2-phosphoric acid and salts thereof.

Among them, preferable examples include 12-molybdophosphoric acid, 18-molybdo-2-phosphoric acid, 9-molybdophosphoric acid, 12-tungstophosphoric acid, 18-tungsto-2-phosphoric acid, 11-molybdo-1-vanadophosphoric acid, 12-molybdotungstophosphoric acid, 6-molybdo-6-tungstophosphoric acid, 12-molybdotungstovanadophosphoric acid, 12-tungstovanadophosphoric acid, 12-molybdosilicic acid, 12-tungstosilicic acid, 12-molybdotungstosilicic acid, 12-molybdotungstovanadosilicic acid, 12-tungstoboric acid, 12-molybdoboric acid, 12-molybdotungstoboric acid, 12-molybdovanadoboric acid, 12-molybdotungstovanadoboric acid, 12-tungstogermanic acid and 12-tungstoarsenic acid.

The kinds of the salts are not particularly limited. For example, there may be employed salts of the metals belonging to group I of the periodic table such as Li, Na, K, Rb, Cs, Cu, Ag, Au, etc., group II such as Mg, Ca, Sr, Ba, Zn, Cd, Hg etc., group III such as Sc, La, Ce, Al, Ga, In, etc., group VIII such as Fe, Co, Ni, Ru, Pd, Pt, etc. or other metals such as Sn, Pb, Mn, Bi, etc., or ammonium salts, amine salts and others.

Typical examples of these salts may include 12-tungstophosphate-1-lithium ($LiH_2PW_{12}O_{40}$), 12-tungstophosphate-2-lithium ($Li_2HPW_{12}O_{40}$), 12-tungstophosphate-1-sodium ($NaH_2PW_{12}O_{40}$), 12-tungstophosphate-2-sodium ($Na_2HPW_{12}O_{40}$), 12-tungstophosphate-2-potassium ($K_2HPW_{12}O_{40}$), 12-tungstophosphate-2-cesium ($Cs_2HPW_{12}O_{40}$), 12-tungstophosphate-2-silver ($Ag_2HPW_{12}O_{40}$), 12-tungstophosphate-1-magnesium ($MgHPW_{12}O_{40}$), 12-tungstophosphate-1-calcium ($CaHPW_{12}O_{40}$), 12-tungstophosphate-1-zinc ($ZnHPW_{12}O_{40}$), 12-tungstophosphate-1-nickel ($NiHPW_{12}O_{40}$), 12-tungstosilicate-1-nickel ($NiHSiW_{12}O_{40}$), 12-tungstosilicate-2-lithium ($Li_2H_2SiW_{12}O_{40}$), 12-tungstosilicate-2-silver ($Ag_2H_2SiW_{12}O_{40}$, 12-tungstosilicate-1-magnesium ($MgH_2SiW_{12}O_{40}$), 12-tungstosilicate-1-aluminum ($AlHSiW_{12}O_{40}$), 12-tungstosilicate-2-indium ($InHSiW_{12}O_{40}$), 12-tungstosilicate-1-gallium ($GaHSiW_{12}O_{40}$), 12-molybdophosphate-1-lithium ($LiH_2PMo_{12}O_{40}$), 12-molybdophosphate-1-magnesium ($MgHPMo_{12}O_{40}$), 12-tungstophosphate-2-ammonium (($NH_4$)$_2HPW_{12}O_{40}$), 12-tungstosilicate-1-tetramethylamine ($N(CH_3)_4H_3SiW_{12}O_{40}$), 12-tungstophosphate-1-iron ($FePW_{12}O_{40}$), 12-tungstophosphate-1-bismuth ($BiPW_{12}O_{40}$), 12-tungstophosphate-1-aluminum ($AlPW_{12}O_{40}$), 12-tungstophosphate-1-chromium ($CrPW_{12}O_{40}$), 12-tungstophosphate-1-gallium ($GaPW_{12}O_{40}$), 12-tungstophosphate-1-indium ($InPW_{12}O_{40}$) and the like. A mixture with heteropolyacid may also be employed. The heteropoly-acid salt may be prepared by titrating an aqueous solution of a heteropoly-acid with carbonates or nitrates of various metals, ammonia, amines, etc., followed by evaporation to dry.

These heteropoly-acids or salts thereof may also be used as the catalyst in the redeced form thereof.

In general, a heteropoly-acid or its salt exists in the state wherein 20 to 40 molecules of water coordinated per one molecule thereof. In this state, however, it has no polymerization activity. Whereas, when the above catalyst is subjected to drying treatment to change its number of water molecules coordinated (the molar ratio of the water coordinated to the heteropoly-anion), it has been found unexpectedly that polymerization activity appeared when the moles of water existing in the catalyst phase per one heteropoly-anion was reduced to not more than 15, particularly not more than 8, and, moreover, specific ability could be exhibited such that the polyhydric alcohol was also activated to form a copolymer with THF in which the residue of the polyhydric alcohol is also bonded to the inner part of the polymer chain. If the molar ratio of water to the heteropoly-anion existing in the catalyst phase is less than 0.1, the efficiency of terminal hydroxylation will become worse. Therefore, the above ratio is required to be within the range of from 0.1 to 15. Although slightly different depending on the heteropoly-acid or its salt employed and the composition of the starting materials, the catalyst in which water is allowed to co-exist in an amount within the above range will not generally be dissolved uniformly in the starting material solution in the polymerization system, but it exists as a catalyst liquid phase while forming two liquid phases with the starting material organic phase or as a solid phase. If the water content is greater than the above ratio, polymerization activity will disappear and the heteropoly-acid becomes homogeneously soluble in the starting material solution. More specifically, the polymerization system will generally form two liquid phases comprised of a catalyst liquid phase and a starting material organic phase when water is allowed to exist at a ratio of 1 to 15 molecules per one heteropoly-anion. If the amount of water is reduced to less than the ratio of about 1, the catalyst becomes a solid phase. However, even when water exists at a ratio of 1 to 15 molecules per one heteropoly-anion, some heteropoly-acid salts do not form a liquid phase but remain as a solid phase. In addition, the catalyst sometimes dissolves homogeneously without forming two liquid phases if the polyhydric alcohol concentration in the starting material is very high. When the above ratio is within the range from 1 to 8, a polyether polyol having a number average molecular weight of 600 to 3,500, which can preferably be used as a starting material for elastomers is obtained.

Polymerization activity and the molecular weight of the polymer obtained will vary depending on the molar ratio of water to the heteropoly-anion existing in the catalyst phase, and their relationship will also be changed depending on the sort of the catalyst employed. Accordingly, it is preferable to carry out the reaction with an optimum content of water which can easily be determined according to the respective conditions and purposes.

In the present invention, the water allowed to exist in the catalyst phase is estimated to exist in the state of being coordinated to the catalyst, when the catalyst is a solid phase, while in the state of being coordinated to the catalyst or of being dispersed in the catalyst phase, when the catalyst is a liquid phase. In this specification, the number of coordinated water molecules is defined as the average number of water molecules coordinated per one heteropoly-anion, when the catalyst is a solid phase, while it is defined as the value of the total number of water molecules in the catalyst liquid phase divided by the number of existing heteropoly-anions, when the catalyst exists as a liquid phase.

The number of coordinated water molecules can be controlled by heating the heteropoly-acid or its salt to a high temperature lower than the decomposition temperature or maintaining it at reduced pressure at a relatively lower temperature. Since the decomposition temperature of the catalyst differs depending on the particular catalyst employed, the heating temperature will be determined depending on the catalyst, but it is generally within the range of from 100° C. to 320° C. It is also possible to control and increase the number of coordinated water molecules by adding a necessary amount of water mixed into the starting material for polymerization such as THF.

In the reaction, wherein a polyhydric alcohol is incorporated into the polymer chain through an ether linkage, water is formed and polymerization activity will be lost if the content of water in the system exceeds 15-fold moles of the heteropoly-anion. Accordingly, it is necessary to determine the molar ratio of a polyhydric alcohol to be reacted relative to THF and relative to the catalyst so that the amount of coordinated water molecules will not exceed 15 by the water formed in the system in an amount larger than the amount consumed as the polymer ends. When it is desired to raise further the molar ratio of an alcohol/THF, water can be removed by distillation or other methods to maintain the number of water molecules coordinated to the heteropoly-anion at not more than 15, whereby a ratio of copolymerization of the alcohol can be enhanced.

On the contrary, if the amount of water molecules is less than that consumed at the terminal ends of the polymer, the number of coordinated water molecules in the catalyst will be decreased with the progress of the reaction, whereby the polymer obtained will be increased in molecular weight with elapse of time, and therefore it is preferred to carry out the reaction while controlling the content of water in the catalyst phase at a constant level by addition of a polyhydric alcohol or water.

The amount of the catalyst employed is not particularly limited, but the polymerization rate is slow if the catalyst amount in the reactor is small, and therefore it is used in an amount of 0.01 to 20-fold weight, preferably 0.1 to 3-fold weight, of the starting material.

When the reaction is carried out in a two-liquid phase system with a volume of the catalyst liquid phase of 10% or more, preferably 30% or more, of the total liquid phase volume in the reactor, a polymer having a very sharp molecular weight distribution can be obtained after the reaction from the starting material organic phase. The mechanism in which a polymer with a sharp molecular weight distribution is formed is not clearly understood, but it may be estimated to be due to the selective extracting function possessed by the two-liquid phase system which migrates polymers having a certain or higher levels of molecular weights selectively to the starting material organic phase and makes polymers having molecular weight lower than the levels remain in the catalyst liquid phase. For this reason, if the ratio of the catalyst liquid phase occupied in the total liquid phase is lower, the selective extracting function through levels of molecular weight of polymers by the two-liquid phase will be damaged to give no sharp moelcular weight distribution.

Also, the catalyst may be carried on a carrier capable of adsorbing a heteropoly-acid or its salt such as activated charcoal, silica alumina, alumina, etc. and used as a fixed bed or a fluidized bed. By using a carried catalyst, separation between the polymer obtained and the catalyst can very easily be done with the catalyst amount dissolved in the polymer phase being very small, whereby the purification steps can be simplified to a great extent. As a carrier, activated charcoal is particularly preferred for its great adsorptive force for heteropoly-acids and salts thereof.

The reaction materials and the like to be provided for polymerization should preferably contain no impurity such as peroxides or others.

The reaction temperature should preferably be from −10° to 120° C., particularly from 30° to 80° C., since too high a temperature tends to lower the degree of polymerization and polymer yield. The yield will be decreased abruptly if the temperature exceeds 120° C. The reactivity is lower at a temperature lower than −10° C.

The time required for the reaction, which may differ depending on the catalyst amount and the reaction temperature, is 0.5 to 50 hours. The reaction pressure may be either atmsspheric, pressurized or reduced pressure.

In the process of the present invention, the reaction may be carried out while stirring a polyhydric alcohol and THF or a polyhydric alcohol, THF and a cyclic ether together with a catalyst having a predetermined number of coordinated water molecules.

The reaction system may include those conventionally used, such as the tank system, the tower system, etc. Also, either a batch system or a continuous systerm may be practiced.

After the reaction, the catalyst may be removed by filtration, when it is a solid phase, or by phase separation, when it is a liquid phase and separated into two phases, or by extraction, etc., when it is homogeneously dissolved, followed by removal of unreacted monomers by distillation, etc., whereby the polyether polyol can be obtained. The polymer obtained is purified by washing or treatment with adsorbents, etc. to provide a commercial product. The catalyst may be used repeatedly as such, or after readjustment of the number of coordinated water molecules, if desired.

The composition of the copolymer can be varied within the range of from 0.5 to 99.5 wt. % of the content of oxytetramethylene groups derived from THF. The preferable composition of the copolymer for use as the starting material for elastomers such as polyurethane elastomers comprises 10 to 99.5 wt. % of the content of oxytetramethylene groups, more preferably 50 to 98 wt. %, particularly preferably 70 to 95 wt. %. When a copolymer contains oxytetramethylene groups in excess of 99.5 wt. %, substantial differences in physical properties and chemical properties from PTMG which is the homopolymer of THF will become very small.

When an alkylene glycol having 5 or more carbon atoms such as 1,5-pentane diol or 1,6-hexane diol is used as a polyhydric alcohol, a polyether glycol can be obtained, comprising the constituent unit represented by the formula (I) shown below and the constituent unit represented by the formula (II) shown below, with both ends of the molecule being hydroxyl groups:

$$\mathrm{-\!\!\left[(CH_2)_4\!-\!O\right]\!\!-} \tag{I}$$

$$\mathrm{-\!\!\left[(CH_2)_n\!-\!O\right]\!\!-} \tag{II}$$

(wherein n is an ineeger of 5 or more).

A polyetherglycol wherein the molar ratio of the unit (I) to the unit (II) is 99:1 to 5:1, having a number average molecular weight of 500 to 10,000 is a polyether glycol which can preferably be used as soft segments for an elastomer such as polyurethane, polyester, polyamide, etc. Above all, a polymer wherein the molar ratio of the unit (I) to the unit (II) is 50:1 to 5:1, having a number average molecular weight of 500 to 3,500 is particularly preferable as soft segments for an elastomer.

When neopentyl glycol is used as a polyhydric alcohol, a polyether glycol can be obtained, comprising the constituent unit represented by the formula (I) shown below and the constituent unit represented by the formula (III) shown below, with both ends of the molecule being hydroxyl groups:

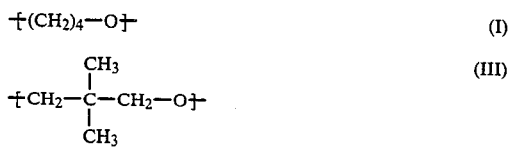

A polyetherglycol wherein the molar ratio of the unit (I) to the unit (III) is 99:1 to 5:1, having a number average molecular weight of 500 to 10,000 and a melting point of 18° C. or lower, is a polyether glycol which is hard to crystallize even when the polymer has high molecular weight, and therefore can preferably be used as soft segments for an elastomer such as polyurethane, polyester, polyamide, etc. The elastomer employing this polyetherglycol as soft segments exhibits excellent elastic recovery even at lower temperatures. Its number average molecular weight is preferably 500 to 3,500.

On the other hand, when a nitrogen-containing alcohol having a moiety comprising a secondary amine or a tertiary amine or a salt thereof in the molecule, a polyether polyol containing nitrogen can be obtained. When a compound having the formula shown below is used as the polyhydric alcohol containing nitrogen:

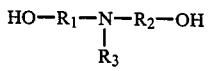

[wherein $R_2$ and $R_2$ are selected from the group consisting of $-(CH_2)_n-$ (wherein n: 2-10), $-CH_2CH_2-O-CH_2CH_2-$ and $-CH_2CH_2CH_2-O-CH_2CH_2CH_2-$, and $R_3$ is selected from the group consisting of hydrogen atom and alkyl groups having 1 to 10 carbon atoms), a polyether glycol comprising the constituent unit represented by the following formula (I) shown below and the constituent unit represented by the following formula (IV) shown below, with both ends of the molecule being hydroxyl groups, can be obtained:

[wherein $R_1$, $R_2$ and $R_3$ are respectively the same as described above].

A polyetherglycol with a molar ratio of the unit (I) to the unit (IV) of 99:1 to 5:1, having a number average molecular weight of 500 to 10,000, can preferably be used as soft segments for an elastomer such as polyurethane, polyester, polyamide, etc. Its number average molecular weight is preferably 500 to 3,500. Polyetherglycols and elastomers synthesized by using these as a starting material are generally known to show signs of deterioration such as yellow discoloration or lowering in strength, when exposed to oxygen, $NO_x$ gas, light, heat, etc. As a method for preventing such deterioration, it has generally been practiced to incorporate a stabilizer such as a phenolic compound, an amine compound, a sulfur compound, etc. However, such methods involve drawbacks because the amount of the stabilizer employed is limited due to compatibility with the polymer, the stabilizer added may bleed out on the polymer surface to reduce the effect of the stabilizer, etc. The polyurethane synthesized by using a nitrogen-containing polyetherglycol as described above will scarcely be discolored to yellow even when exposed to $NO_x$ gas and also has the specific feature of excellent dyeing property. This is because amine structures are incorporated into the molecule and the excellent dyeing property may be considered to be due to the presence of amine structures in the soft segment.

A polyether polyol containing sulfur obtained when employing a polyhydroxyalkylsulfide as the polyhydric alcohol is very stable even when exposed to oxygen, light, heat, etc. and also preferably used as soft segments for an elastomer such as polyurethane, polyester, polyamide, etc. Its number average molecular weight is preferably 500 to 3,500.

According to the present method, various polyhydric alcohols can be copolymerized with THF, and further polyhydric alcohols are copolymerized randomly within the chains formed by ring opening polymerization of THF. Accordingly, most of the polyether polyols obtained are lower in crystallinity as compared with PTMG, and the elastomers by using these as soft segments can be expected to exhibit excellent resilient recovery even at low temperatures. Also, according to the present method, it is possible to introduce amino groups or sulfur atoms into the polymer chains to synthesize polyalkylene ether polyols having yellow discoloration resistance and heat resistance not found in PTMG.

Further, according to the present method, additional advantages unknown in the prior art can be obtained such that polyalkylene ether polyols can be synthesized in one step without requiring the hydrolysis step and that the catalyst employed can be used repeatedly.

The present invention is described in more detail by referring to the followng Examples.

EXAMPLE 1

Into a vessel equipped with a stirring means and a reflux condenser were charged 200 g of THF containing 350 ppm of $H_2O$ and 8.5 g of ethylene glycol. Then, 100 g of tungstophosphoric acid ($H_3PW_{12}O_{40}$) heated at 300° C. for 3 hours to be made anhydrous was added thereto (the moles of ethylene glycol were about 4-fold of the moles of tungstophosphoric acid, and the amount of water produced when the whole ethylene glycol is copolymerized is 4-fold moles of tungstophosphoric, if the amount consumed as the terminal OH groups is not reckoned into calculation). By setting the temperature at 60° C., stirring was continued in a nitrogen atmosphere for 4 hours, and the mixture was left to stand at room temperature to be separated into two phases.

From the upper layer, unreacted THF was removed by distillation to obtain 42 g of a transparent and viscous polymer.

The polymer obtained was found to have a number average molecular weight of 1500 as the result of measurement by gel permeation chromatography (GPC). The polymer had a melting point of 14° C. as measured by a differential scanning calorimeter (PERKIN-ELMER DSC-2) (at a temperature elevation speed of 4° C./min.), which was lower by about 10° C. as compared with the PTMG having the same molecular weight. The $^1$H-NMR spectrum (400 MHz) of the polymer obtained is shown in FIG. 1, in which the axis of abscissa indicates the chemical shift (ppm) when employing tetramethylsilane as a standard substance. As the result of detailed analysis, it was found that the polymer was a polyether glycol formed by a copolymerization of ethylene glycol and THF at a molar ratio of ethylene glycol/THF being 1/9, and the ratio of oxydimethylene groups existing at the ends of the molecule to those in the molecular chain was 26:74.

Figure 2:
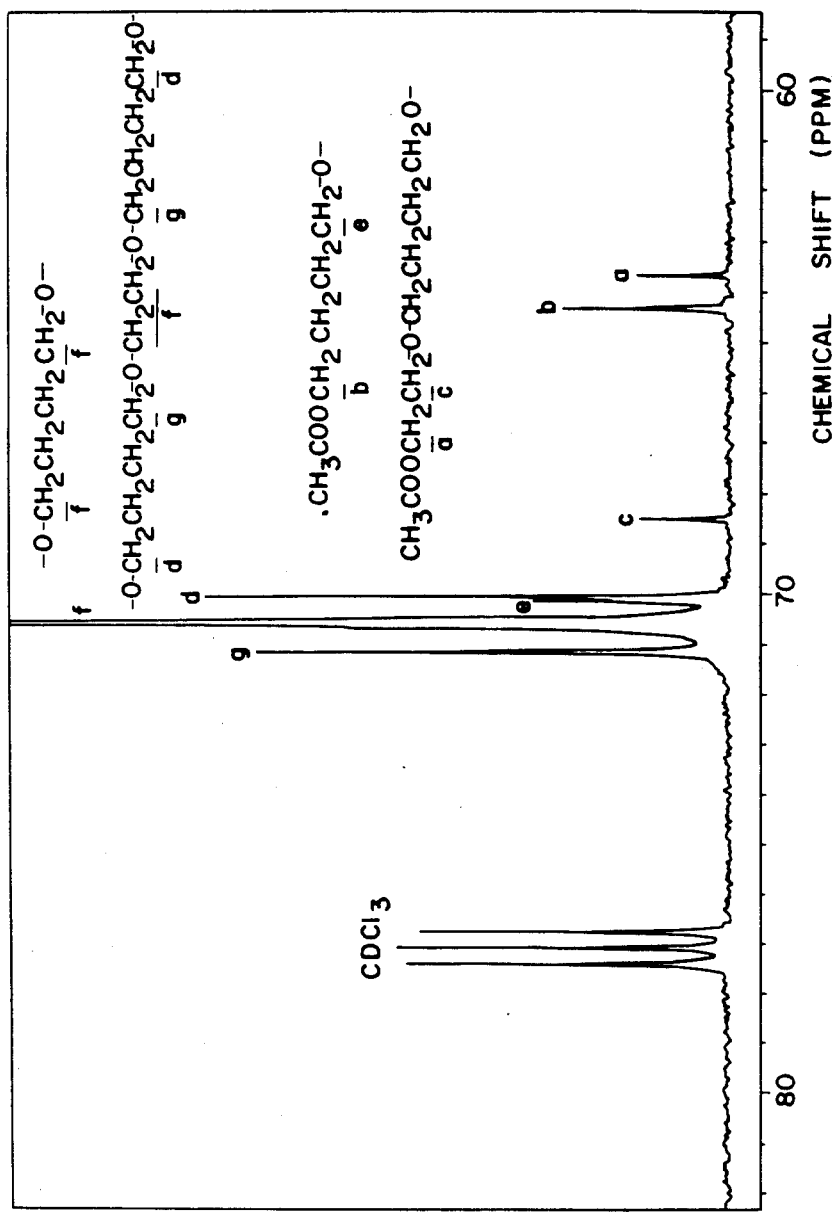
FIG. 2 shows $^{13}$C-NMR spectrum of a copolymerized polyether glycol of THF and ethylene glycol, of which terminal hydroxyl groups have been acetylated, as described in Example 1 (measured by means of JEOL JNM-GX 400 NMR device)

Also, the $^{13}$C-NMR spectrum of the polymer obtained of which hydroxyl groups at both ends were acetylated is shown in FIG. 2, in which the axis of abscissa indicates the chemical shift (ppm) when employing tetramethylsilane as a standard substance. When oxydimethylene groups exist consecutively from the terminal end, the carbon at the β-position of the terminal acetyl group

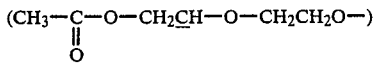

exists at the position of δ69.1 ppm, but the carbon at the β-position of the terminal acetyl group in this polymer exists at δ68.5 ppm, thus indicating that they are not units existing consecutively from the terminal end. It can be estimated from the above results that ethylene glycol was not copolymerized in blocks but randomly.

EXAMPLE 2

Figure 3:
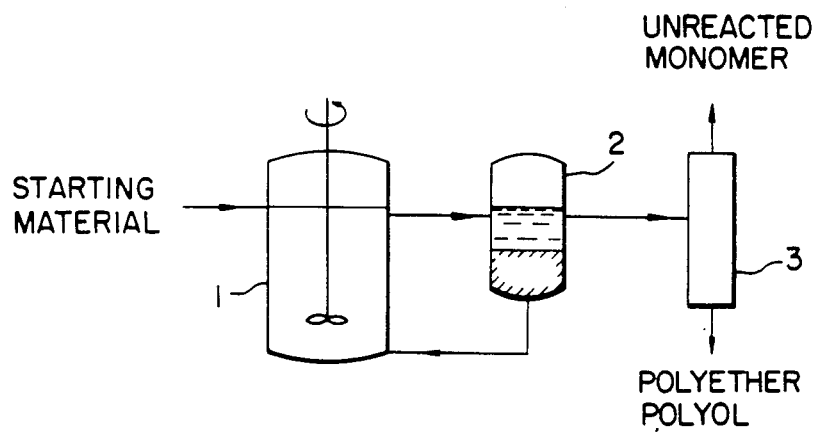
FIG. 3 shows a schematic flow chart of a continuous polymerization device which can be used in practicing the process of the present invention.

Polymerization was carried out by using the continuous polymerization device as shown in FIG. 3. First, into a polymerization tank 1 having a volume of 300 ml and having a stirring means and a reflux condenser was charged 200 g of tungstophosphoric acid having a coordinated water number of 3.5 ($H_3PW_{12}O_{40} \cdot 3.5H_2O$). 150 g of a monomer mixture containing THF and a predetermined amount of diols as indicated in Table 1 was added thereto and the mixture was stirred. By setting the polymerization tank temperature at 60° C., stirring was continued in a nitrogen atmosphere for 4 hours and feeding of the mixture containing THF and a predetermined amount (see Table 1) of diols was commenced at the rate of 32 ml/Hr. The mixture in the polymerization tank was delivered to a phase separation tank 2, and the upper layer separated was removed by allowing it to be overflown, and the catalyst phase of the lower layer was returned to the polymerization tank, wherein the reaction was carried out again. Thus, continuous running was carried out for 100 hours. From the upper phase liquid overflown, unreacted THF was removed by distillation at the distillation tower 3 to obtain a polymer. All the polymers were found as a result of analysis to be polyether glycol having OH groups at both ends in which one molecule of diols on an average in one molecule of polymer was randomly copolymerized. The compositions of the starting materials when employing various kinds of diols and the results were shown in Table 1.

Figure 4:
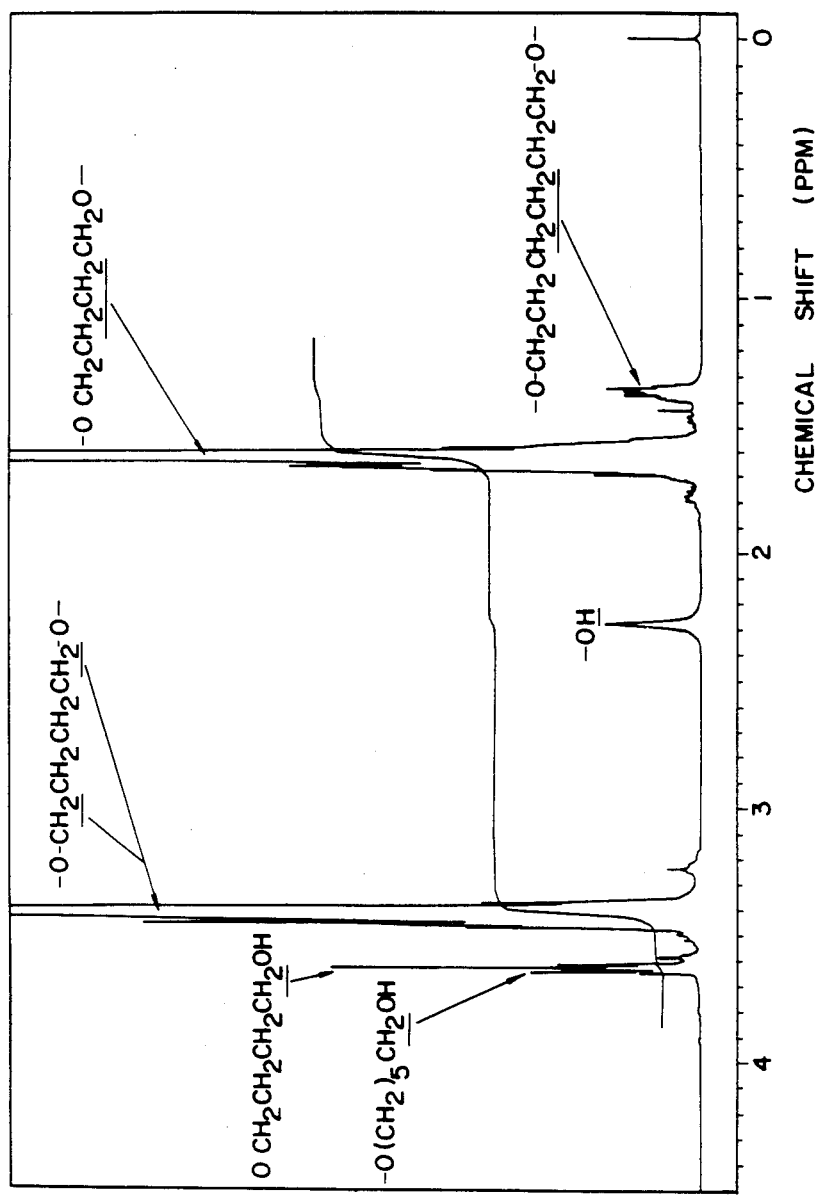
FIG. 4 shows $^1$H-NMR spectrum of a copolymerized polyether glycol of THF and 1,6-hexane diol as described in Example 2 (measured at 400 MHz by means of JEOL JNM-GX 400 NMR device)

The $^1$H-NMR spectrum (measured by JEOL JNM-GX400 nuclear magnetic resonance apparatus) of the polyether glycol prepared by copolymerizing THF with 1,6-hexane diol is shown in FIG. 4, in which the axis of abscissa indicates the chemical shift (ppm) when employing tetramethylsilane as a standard substance.

TABLE 1

| Comonomer | Composition of starting material: $\frac{\text{Diol}}{\text{Diol + THF}}$ (wt. %) | Polymer yield (%) | Number average molecular weight of polymer | Melting point*[1] of polymer (°C.) |
|---|---|---|---|---|
| Ethylene glycol | 1.8 | 29 | 1600 | 16 |
| 1,3-Propane diol | 1.35 | 34 | 1800 | 14 |
| 1,6-Hexane diol | 1.65 | 31 | 1500 | 18 |
| 1,3-Butane diol | 1.60 | 30 | 1700 | 15 |

*[1] measured by differential scanning calorimeter (PERKIN-ELMER DSC-2 Model) at a temperature elevating speed of 4° C./min.

EXAMPLE 3

Into a vessel equipped with a stirring means and a reflux condenser were charged 200 g of THF containing 350 ppm of $H_2O$ and 10.6 g of 1,3-propane diol. Then, each of 100 g of the catalysts made to anhydrous state as indicated in Table 2 was added thereto. At a temperature set at 60° C., stirring was continued in a nitrogen atmosphere for 4 hours and the mixture was left to stand at room temperature to be separated into two phases. From the uppe layer, unreacted THF was removed by distillation to obtain a copolymer in which 1,3-propanol was copolymerized. The yields of the polymers obtained are shown in Table 2. The number of coordinated water in the catalysts during the reaction was within the range of from 0.5 to 4.

TABLE 2

| Catalyst | Polymer yield (g) |
|---|---|
| 12-molybdo-1-phosphoric acid ($H_3PMo_{12}O_{40}$) | 60 |
| 18-molybdo-2-phosphoric acid ($H_6P_2Mo_{18}O_{62}$) | 18 |
| 12-tungsto-1-phosphoric acid ($H_3PW_{12}O_{40}$) | 51 |
| 18-tungsto-2-phosphoric acid ($H_6P_2W_{18}O_{62}$) | 35 |
| 12-tungsto-1-silicic acid ($H_4SiW_{12}O_{40}$) | 45 |
| 12-tungsto-1-germanic acid ($H_4GeW_{12}O_{40}$) | 48 |
| 12-tungsto-1-boric acid ($H_5BW_{12}O_{40}$) | 31 |
| 12-tungsto-1-arsenic acid ($H_3AsW_{12}O_{40}$) | 36 |
| 11-molybdo-1-vanado-1-phosphoric acid ($H_4PMo_{11}VO_{40}$) | 43 |
| 12-tungsto-1-phosphate-2-cesium ($Cs_2HPW_{12}O_{40}$) | 28 |
| 12-tungsto-1-phosphate-1-alminum ($AlPW_{12}O_{40}$) | 35 |
| 12-tungsto-1-phosphate-1-bismuth ($BiPW_{12}O_{40}$) | 38 |
| 12-tungsto-1-silicate-1-lithium ($LiH_3SiW_{12}O_{40}$) | 23 |
| 12-tungsto-1-silicate-1-calcium ($CaH_2SiW_{12}O_{40}$) | 17 |
| 12-molybdo-1-phosphate-1-cesium | 20 |

TABLE 2-continued

| Catalyst | Polymer yield (g) |
|---|---|
| (CsH$_2$PMo$_{12}$O$_{40}$) | |
| 12-molybdo-1-silicate-1-lithium (LiH$_3$SiMo$_{12}$O$_{40}$) | 21 |
| 12-tungsto-1-arsenate-1-lithium (LiH$_2$AsW$_{12}$O$_{40}$) | 18 |
| 12-tungsto-1-phosphate-1-indium (InPW$_{12}$O$_{40}$) | 31 |
| 12-tungsto-1-phosphate-1-chromium (CrPW$_{12}$O$_{40}$) | 33 |

EXAMPLE 4 AND COMPARATIVE EXAMPLE 1

Into a vessel equipped with a stirring means and a reflux condenser were charged 200 g of THF and 1,3-propane diol in amounts as indicated in Table 3. Then, 100 g of tungstophosphoric acid controlled to a coordinated water number of 2 was added thereto. At a temperature set at 60° C., stirring was continued in a nitrogen atmosphere for 4 hours and the mixture was left to stand at room temperature to be separated into two phases. From the upper layer, unreacted THF was removed by distillation to obtain a polymer. The polymerization results and the number average molecular weights determined by GPC were shown in Table 3.

TABLE 3

|  | 1,3-Propane diol (g) | 1,3-Propane diol / H$_3$PW$_{12}$O$_{40}$ (molar ratio) | Polymer yield (g) | Number average molecular weight of polymer |
|---|---|---|---|---|
| Example 4 | 5.3 | 2 | 48 | 1800 |
|  | 10.6 | 4 | 23 | 1300 |
|  | 15.9 | 6 | 6.5 | 600 |
| Comparative example 1*[1] | 47.7 | 18 | trace | — |

*[1]Substantial number of coordinated water molecules in the catalyst during the reaction was 15 or more.

EXAMPLE 5

Polymerization was carried out by using the continuous polymerization device as shown in FIG. 3. First, into a 300 ml of polymerization tank 1 having a stirring means and a reflux condenser was charged 200 g of 12-tungstophosphoric acid having a coordinated water number of 3.5 (H$_3$PW$_{12}$O$_{40}$.3.5H$_2$O). 150 g of a monomer mixture containing THF and 1.8 wt. % of 1,4-butane diol was added thereto, and the mixture was stirred. By setting the polymerization tank temperature at 60° C., stirring was continued in a nitrogen atmosphere for 4 hours and feeding of a mixture containing THF and 1.8 wt. % of 1,4-butane diol was commenced at the rate of 32 ml/Hr. The reaction was carried out while circulating the liquid from the lower layer in the phase separation tank 2 to the reaction tank and removing the upper layer after phase separation by allowing it to overflow. From the upper layer liquid overflown, unreacted THF was removed by distillation to obtain PTMG. Substantially no unreacted 1,4-butane diol was detected. After continuous running for 100 hours, 850 g of PTMG having a number average molecular weight of 1750 was obtained.

EXAMPLE 6

Into a vessel equipped with a stirring means, 100 g of THF wihh a water content of 350 ppm, 3 g of 1,4-butane diol and 6 g of a PTMG oligomer having a number average molecular weight of 600 were added. Then, 50 g of 12-tungstosilicate-1-lithium (LiH$_3$SiW$_{12}$O$_{40}$) was added thereto. The vessel was sealed up and stirring was continued at 60° C. in a nitrogen atmosphere for 6 hours. After the reaction, the mixture was left to stand to be separated into two liquid phases, and the catalyst phase of the lower layer was separated. From the upper phase, unreacted THF was removed by distillation to obtain 31 g of PTMG having a number average molecular weight of 1800.

EXAMPLE 7

Into a vessel equipped with a stirring means and a reflux condenser, 200 g of THF containing 350 ppm of H$_2$O, 8.0 g of propylene oxide and 13 g of 1,4-butane diol were charged. Then, 100 g of tungstophosphoric acid (H$_3$PW$_{12}$O$_{40}$) made to anhydrous state by heating at 300° C. for 3 hours was added thereto. By setting the temperature at 60° C., stirring was continued in a nitrogen atmosphere for 4 hours, and then the mixture was left to stand at room temperature to be separated into two phases. From the upper phase, unreacted THF was removed by distillation to obtain 49 g of a transparent and viscous polymer. The polymer obtained, as a result of analysis, was found to be a polyalkylene ether glycol, having OH groups at both ends, with two molecules of propylene oxide being copolymerized on an average in one molecule. The number average molecular weight was measured by GPC to be 1500.

EXAMPLE 8

By means of a continuous polymerization device as shown in FIG. 3, polymerization was carried out. First, into a polymerization tank 1 having a volume of 10 liter and having a stirring means and a reflux condenser, 3.0 Kg of THF containing 200 ppm of water and 1.8 wt. % neopentyl glycol was charged. While stirring the mixture, 8.0 Kg of tungsophosphoric acid (H$_3$PW$_{12}$O$_{40}$) made anhydrous by heating at 300° C. was added thereto to prepare a catalyst liquid phase. The catalyst liquid phase has a volume of about 6.3 liter. Then, by setting the temperature at 60° C., THF containing 200 ppm of water and 1.8 wt. % of neopentyl glycol was fed into the vessel at a rate of one liter/hour. The liquid in the polymerization tank overflown was subjected to phase separation in the phase separation tank 2, and polymerization was carried out, while withdrawing the starting material organic phase of the upper phase continuously and returning the catalyst liquid phase into the polymerization tank. From the starting material organic phase, unreacted THF was recovered by vacuum distillation to obtain 27.8 Kg of a polymer. The polymer was analyzed to find that it was a polyalkylene ether glycol, having OH groups at both ends, with one molecule of neopentyl glycol randomly copolymerized on an average per one molecule of the polymer. The number average molecular weight was found to be 1970, with the molecular weight distribution ($\overline{M}$vis/$\overline{M}$n) being 1.58. Here, $\overline{M}$n is the number average molecular weight determined by quantifying OH groups, and $\overline{M}$vis is a viscosity average molecular weight and calculated from the following formula correlated with the viscosity measured at 40° C.:

$\overline{M}$vis=antilog (0.493 log viscosity(cp)+3.0646).

In the Examples shown below, unless otherwise noted, the molecular weight distribution ($\overline{M}vis/\overline{M}$) was determined according to the above method.

Figure 5:
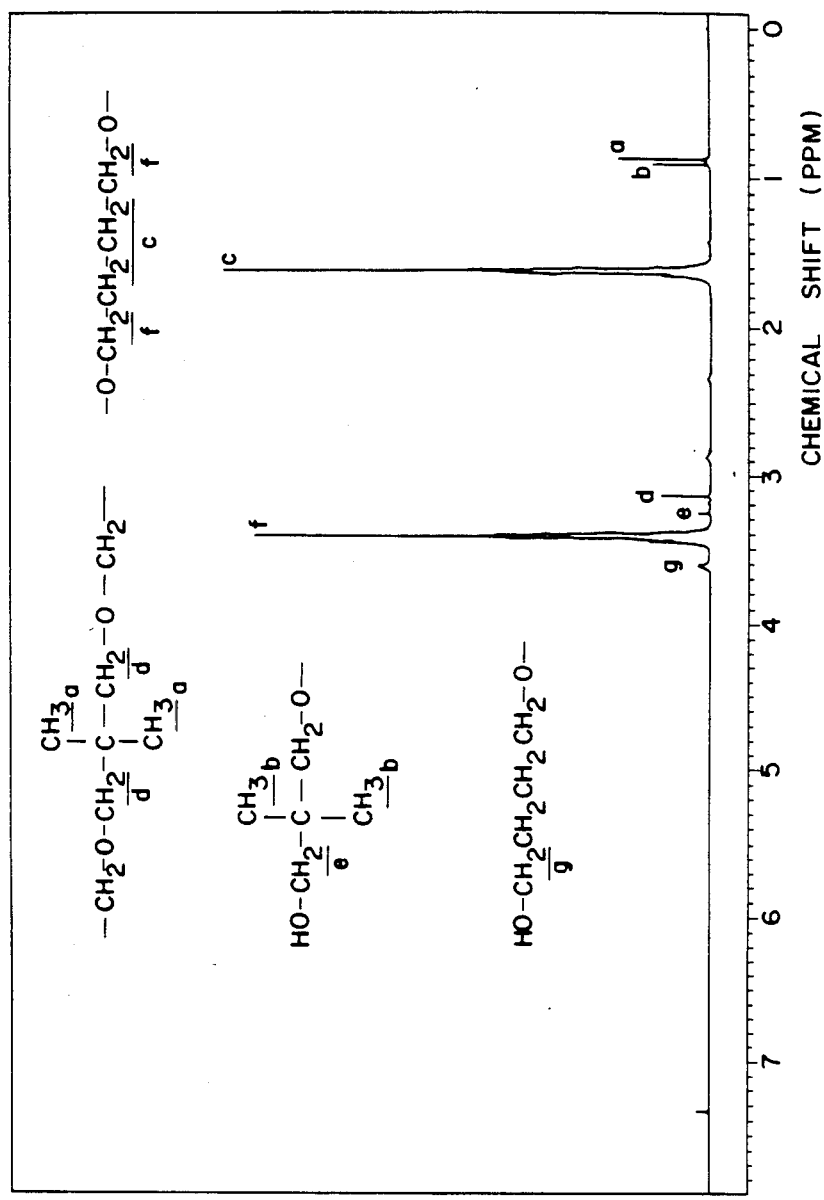
FIG. 5 shows $^1$H-NMR spectrum of a copolymerized polyether glycol of THF and neopentyl glycol as described in Example 8 (measured at 400 MHz by means of JEOL JNM-GX 400 NMR device)

This polymer was found to have a melting point of 10° C., as a result of measurement by means of a differential scanning calorimeter (PERKIN-ELMER DSC-2 MODEL) (measured at a temperature elevation speed of 4° C./min.). The $^1$H-NMR spectrum of this polymer is shown in FIG. 5, wherein the axis of abscissa shows the chemical shift (ppm) when employing tetramethylsilane as a standard substance.

EXAMPLE 9 AND COMPARATIVE EXAMPLE 2

Into a vessel equipped with a stirring means and a reflux condenser were charged 200 g of THF containing 100 ppm of $H_2O$ and 4.2 g of ethylene glycol. To this mixture was added 100 g of tungstophosphoric acid ($H_3PW_{12}O_{40}\cdot nH_2O$) controlled to a certain number of coordinated water by heating at a temperature of 150° to 250° C. for 0.5 to 2 hours. After stirring was continued at 60° C. in a nitrogen atmosphere for 4 hours, the mixture was left to stand at room temperature to be separated into two phases. From the upper layer, unreacted THF was removed by distillation to obtain a copolymerized polyether glycol of ethylene glycol and THF. The polymerization results are shown in Table 4. The number average molecular weights were measured by GPC.

TABLE 4

| | Water in catalyst phase (mol) Heteropolyacid (mol) | Form of polymerization system | Polymer Yield (%) | Polymer Number average molecular weight |
|---|---|---|---|---|
| Example 9 | 3 | Two-liquid phase | 24 | 1950 |
| | 5 | Two-liquid phase | 15 | 1350 |
| | 8 | Two-liquid phase | 3.5 | 800 |
| | 10 | Two-liquid phase | 1.0 | 600 |
| Comparative example 2 | 18 | Homogeneous phase | trace | — |
| | 30 | Homogeneous phase | trace | — |

EXAMPLE 10

A vessel equipped with a stirring means was charged with 100 g of THF containing 30 ppm of water, 2 g of 1,3-propane diol and 5 g of a low molecular weight polymer of a polyether polyol (number average molecular weight: 600) wherein 1,3-propane diol and THF are copolymerized at a molar ratio of 1:8. Subsequently, 50 g of tungstosilicic acid ($H_4SiW_{12}O_{40}\cdot 2H_2O$) controlled to a coordinated water number of 2 was added to the mixture. Stirring was continued at 60° C. in a nitrogen atmosphere for 6 hours. After the reaction, the mixture was left to stand at room temperature to be separated into two liquid phases, from which the catalyst layer of the lower phase was separated. Unreacted monomer was removed by distillation from the upper phase to obtain 30 g of a polyether glycol having a number average molecular weight of 1750. Additionally, substantially no unreacted 1,3-propane diol would be detected, and accordingly it can be estimated that all of 1,3-propane diol has copolymerized.

EXAMPLE 11

A vessel equipped with a stirring means was charged with 100 g of THF containing 30 ppm of water, 2 g of 1,3-propane diol, 5 g of a low molecular weight polymer of a polyether polyol (number average molecular weight: 600) wherein 1,3-propane diol and THF are copolymerized at a molar ratio of 1:8 and 2 g of an oligomeric cyclic ether of the formula:

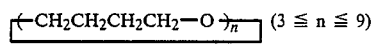
$(3 \leq n \leq 9)$

Subsequently, 50 g of tungstosilicic acid ($H_4SiW_{12}O_{40}\cdot 2H_2O$) controlled to a coordinated water number of 2 was added to the mixture. Stirring was continued at 60° C. in a nitrogen atmosphere for 10 hours. After the reaction, the mixture was left to stand at room temperature to be separated into two liquid phases. Unreacted monomer was removed by distillation from the upper phase to obtain 35 g of a polyether glycol having a number average molecular weight of 2000. This polymer phase as found to contain 0.15 g of the oligomeric cyclic ether, and the catalyst phase contained 0.1 g of the same cyclic ether. From this result, the most of oligomeric cyclic ether may be estimated to be copolymerized into the polymer. Additionally, substantially no unreacted 1,3-propane diol could be detected, and accordingly it can be estimated that all of 1,3-propane diol has copolymerized.

EXAMPLE 12

In 100 g of THF was dissolved 10 g of tungstophosphoric acid with a coordinated water number of 30($H_3PW_{12}O_{40}\cdot 30H_2O$) Then, 50 g of granular activated charcoal was added to the solution, followed by mixing at room temperature for one hour. The activated charcoal was filtered, dried and heated at 300° C. for 3 hours to obtain a carried catalyst. The above carried catalyst in an amount of 50 g, 160 g of THF containing 50 ppm of $H_2O$ and 1.0 g of ethylene glycol were charged into a air-tight stainless steel vessel. After displaced with nitrogen gas, the vessel was hermetically sealed, and shaking was continued for 24 hours on a shaking machine set at 60° C. Next, the catalyst carried on activated charcoal was separated by filtration, and unreacted monomer was removed by distillation from the filtrate to obtain 12 g of a polyether glycol in which ethylene glycol and THF were copolymerized.

EXAMPLE 13

A vessel equipped with a stirring means and a reflux condenser was charged wtth 200 g of THF containing 350 ppm of $H_2O$ and 11.2 g of bis-(2-hydroxyethyl)-n-butylamine:

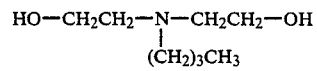

Figure 6:
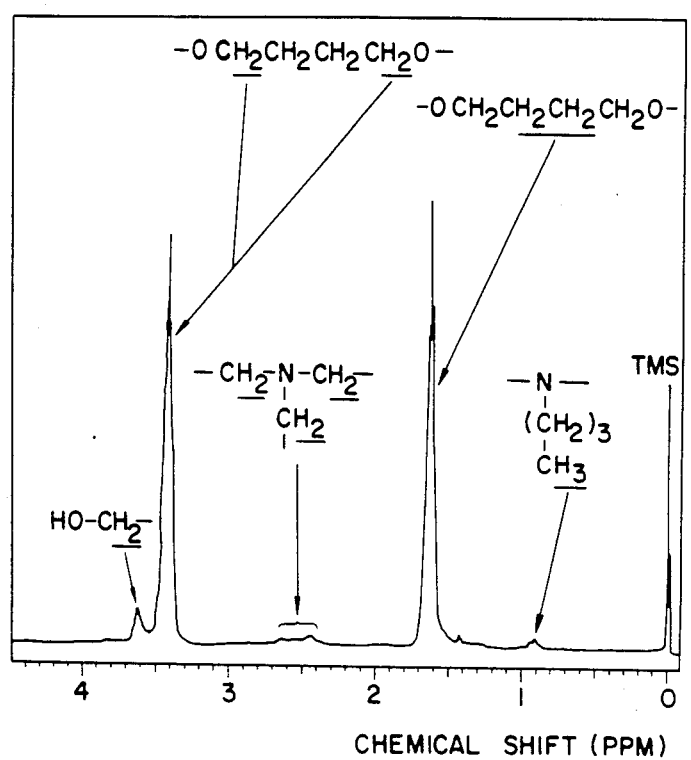
FIG. 6 shows $^1$H-NMR spectrum of a copolymerized polyether glycol of THF and bis-(2-hydroxyethyl)-n-butyl-amine as described in Example 13 (measured at 200 MHz by means of JEOL FX 200 NMR device).

Then, 100 g of tungstophosphoric acid made anhydrous by heating at 300° C. for 3 hours ($H_3PW_{12}O_{40}$) was added thereto. Stirring was continued at 60° C. in a nitrogen atmosphere for 6 hours. The reaction mixture was in a state of two liquid phases, and left to stand after the reaction at room temperature to be separated into two phases. From the upper phase, unreacted THF was removed by distillation to obtain 60.3 g of a transparent and viscous polymer. As a result of elemental analysis and $^1$H-NMR measurement of the polymer obtained, the polymer was found to be a polyether glycol copolymerized at a ratio of bis-(2-hydroxyethyl)-n-butylamine and THF being 1/25. The $^1$H-NMR spectrum of the polymer is shown in FIG. 6, wherein the axis of abscissa shows the chemical shift (ppm) when employing tetramethylsilane as a standard substance. Also, the polymer obtained was found to contain substantially no unreacted bis-(2-hydroxyethyl)-n-butylamine, as confirmed by gas chromatography. As the result of measurement of the molecular weight of the polymer by gel permeation chromatography, the nubmer average molecular weight was found to be 1700.

EXAMPLE 14

Various amines as indicated in Table 5 were charged together with 200 g of THF containing 350 ppm of H$_2$O into a vessel equipped with a stirring means and a reflux condenser. Then, 100 g of tungstophosphoric acid made anhydrous by heating at 300° C. for 3 hours (H$_3$PW$_{12}$O$_{40}$) was added thereto. After stirring was continued at 60° C. in a nitrogen atmosphere for 6 hours, the mixture was left to stand to be separated into two phases. From the upper phase, unreacted THF was removed to obtain a polymer in which amine was copolymerized with THF. Table 5 shows the kind of aminss and the composition of starting materials charged, the polymer yield after the reaction and the nitrogen content in the polymer obtained.

350 ppm of H$_2$O and 8.2 g of thiodiethanol [HO—CH$_2$CH$_2$—S—CH$_2$CH$_2$—OH]. Then, 100 g of tungstophosphoric acid made anhydrous by heating at 300° C. for 3 hours (H$_3$PW$_{12}$O$_{40}$) was added thereto. Stirring was continued at 60° C. in a nitrogen atmosphere for 6 hours. The reaction mixture was in a state of two liquid phases, and after the reaction left to stand to be separated into two phases. From the upper phase, unreacted THF was removed by distillation to obtain 14 g of a transparent and viscous polymer. As a result of elemental analysis of the polymer by fluorescent X-ray and measurement of $^1$H-NMR, the polymer was found to be a polyether glycol copolymerized at a molar ratio of thiodiethanol/THF being 1/22. Substantially no unreacted monomer was found to exist in the polymer obtained. As a result of measurement by gel permeation chromatography (GPC), the polymer obtained was found to have a number average molecular weight of 2,000.

EXAMPLE 16

Into a vessel equipped with a stirring means and a reflux condenser, 200 g of THF containing 350 ppm of H$_2$O and various kinds of thioglycols as indicated n Table 6 were charged. Then, 100 g of tungstophosphoric acid made anhydrous by heating at 300° C. for 3 hours (H$_3$PW$_{12}$O$_{40}$) was added thereto. Stirring was continued at 60° C. in a nitrogen atmosphere for 6 hours. The reaction mixture was in a state of two liquid phases, and after the reaction left to stand to be separated into two phases. From the upper phase, unreacted THF was removed by distillation to obtain a polymer in which a thioglycol and THF were copolymerized. Table 6 shows the kind of thioglycols, the composition of starting materials, and the polymer yield after the reaction.

TABLE 5

| Amine<br>R$_1$<br>\|<br>R$_2$—N—R$_3$ | Composition of starting material:<br>Amine / (Amine + THF) (wt. %) | Polymer yield (%) | Nitrogen content in polymer (wt. %) |
| --- | --- | --- | --- |
| R$_1$ = —C(CH$_3$)$_3$<br>R$_2$ = —CH$_2$CH$_2$CH$_2$CH$_2$OH<br>R$_3$ = —CH$_2$CH$_2$OH | 6.2 | 64 | 0.9 |
| R$_1$ = —CH$_3$<br>R$_2$ = —CH$_2$CH$_2$OH<br>R$_3$ = —CH$_2$CH$_2$OH | 3.9 | 57 | 0.6 |
| R$_1$ = —CH$_2$CH$_2$CH$_2$CH$_3$<br>R$_2$ = —CH$_2$CH$_2$CH$_2$CH$_2$OH<br>R$_3$ = —CH$_2$CH$_2$CH$_2$CH$_2$OH | 7.0 | 56 | 0.7 |
| R$_1$ = —C(CH$_3$)$_3$<br>R$_2$ = —CH$_2$CH$_2$CH$_2$OH<br>R$_3$ = —CH$_2$CH$_2$CH$_2$OH | 6.2 | 60 | 1.0 |
| R$_1$ = —CH$_2$CH$_2$CH$_2$CH$_3$<br>R$_2$ = —CH(CH$_3$)CH$_2$OH<br>R$_3$ = —CH$_2$CH$_2$OH | 5.8 | 50 | 0.4 |
| R$_1$ = —CH$_2$CH$_2$OH<br>R$_2$ = —CH$_2$CH$_2$OH<br>R$_3$ = —CH$_2$CH$_2$OH | 5.9 | 39 | 0.5 |
| R$_1$ = —CH$_2$CH$_2$CH$_2$CH$_3$<br>R$_2$ = —CH$_2$CH$_2$OH<br>R$_3$ = —CH$_2$CH$_2$—O—CH$_2$CH$_2$OH | 6.4 | 38 | 0.4 |
| R$_1$ = H<br>R$_2$ = —CH$_2$CH$_2$OH<br>R$_3$ = —CH$_2$CH$_2$OH | 3.5 | 59 | 0.8 |

EXAMPLE 15

A vessel equipped with a stirring means and a reflux condenser was charged with 200 g of THF containing of starting materials, and the polymer yield after the reaction.

TABLE 6

| Thioglycol ($R_1$—S—$R_2$) | Composition of starting material: Thioglycol $\left[\dfrac{\text{Thioglycol}}{\text{Thioglycol} + \text{THF}}\right]$ (wt. %) | Polymer yield (%) | Number average molecular weight of polymer (wt. %) |
|---|---|---|---|
| $R_1 =$ —$CH_2CH_2CH_2CH_2OH$<br>$R_2 =$ —$CH_2CH_2OH$ | 4.7 | 9 | 2800 |
| $R_1 =$ —$CH_2CH_2OCH_2CH_2OH$<br>$R_2 =$ —$CH_2CH_2OH$ | 5.2 | 12 | 1800 |
| $R_1 =$ —$CH(CH_3)CH_2OH$<br>$R_2 =$ —$CH_2CH_2OH$ | 5.0 | 8 | 1800 |
| $R_1 =$ —$CH_2CH_2SCH_2CH_2OH$<br>$R_2 =$ —$CH_2CH_2OH$ | 5.6 | 3 | 2500 |

EXAMPLE 16

Into a vessel equipped with a stirring means were charged 50 g of THF with a water content of 30 ppm, 1 g of 1,3-propane diol and 15 g of a low molecular weight polymer (number average molecular weight: 600) of a polyether glycol prepared by copolymerization of 1,3-propane diol and THF at a molar ratio of 1:8.

As a next step, 50 g of tungstophosphoric acid ($H_3PW_{12}O_{40} \cdot 1H_2O$) controlled to a coordinated water number of 1 was added to the mixture, and the reaction was carried out under a nitrogen atmosphere at a temperature set at 60° C. for 20 hours. After the reaction, the mixture was added with 250 g of $H_2O$ and 250 g of chloroform, and was mixed, followed by separation into two phases. From the chloroform phase, unreacted monomers and chloroform were removed by vacuum distillation to obtain 25 g of a polymer. The polymer was analyzed to be a polyether glycol in which 1,3-propane diol and THF were copolymerized at a molar ratio of 1:8, having a number average molecular weight of 1950. As a result of analysis of the polymer obtained by gel permeation chromatography (GPC), the low molecular weight polymer of polyether glycol added as the starting material was found to be consumed. Thus, it may be estimated to be used in the copolymerization reaction with THF.

APPLICATION EXAMPLE 1

By using the starting materials of the copolymerized polyetherglycols as shown in Table 7 and PTMG as Control, polyurethane films were prepared. Polyurethane was prepared by adding to the polyetherglycol, 1.55-fold mole thereof of 4,4'-diphenylmethane diisocyanate to synthesize a prepolymer, dissolving the prepolymer in 5-fold weight of the prepolymer of dimethylacetamide solvent and allowing the free isocyanate groups to react with equal moles of amines [a mixture of ethylenediamine and diethylamine; a molar ratio of diethylamine/ethylenediamine being 0.064/1] at 70° C. for 3 hours. The polyurethane obtained had a molecular weight of about 70,000. The polyurethane was formed into a film with a thickness of 0.125 mm and a width of 1 mm and its low temperature recovery (recovery at 10° C. ten seconds after release from elongation after the film had been elongated to 100% at 10° C. for 16 hours) was measured. The results are shown in Table 7, which shows excellent low temperature recovery of the copolymerized polyetherglycol as compared with the polyurethane film employing PTMG.

TABLE 7

| Polyether glycol composition (molar ratio) | Number average molecular weight of polyether glycol*[1] | Recovery*[2] (%) |
|---|---|---|
| $+(CH_2)_5$—$O+$/<br>$+(CH_2)_4$—$O+$ = 1/21 | 2100 | 35 |
| $+(CH_2)_6$—$O+$/<br>$+(CH_2)_4$—$O+$ = 1/25 | 1900 | 34 |
| /<br>$+(CH_2)_4$—$O+$ = 1/28 | 2150 | 81 |
| Control data<br>HO$+(CH_2)_4$—$O+_n$H | 1960 | 24 |

Foot Note:
*[1] number average molecular weight by OH value measurement.
*[2] recovery at 10° C. 10 seconds after release from elongation after the film had been elongated at 10° C. to 100% for 16 hours.

We claim:

1. A polyether glycol comprising the constituent unit represented by the formula (I) shown below copolymerized randomly with the constituent unit (IV) shown below, with a molar ratio of the unit (I) to the unit (IV) being 99:1 to 5:1, having an average molecular weight of 500 to 10,000, with the molecule being terminated at both ends with hydroxyl groups:

$$+(CH_2)_4-O+ \tag{I}$$

$$+R_1-N(R_3)-R_2-O+ \tag{IV}$$

wherein $R_1$ and $R_2$ are selected from the group consisting of —$(CH_2)_n$— (wherein n is an integer of 2 to 4), —$CH(CH_3)CH_2$— and —$CH_2CH_2$—O—$CH_2$—$CH_2$—, and $R_3$ is selected from the group consisting of a hydrogen atom, alkyl groups having 1 to 4 carbon atoms and —$(CH_2)_2$—OH.

2. A process for producing a nitrogen containing polyether polyol which comprises copolymerizing tetrahydrofuran with a polyhydric alcohol having the structural formula

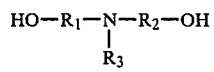

wherein $R_1$ and $R_2$ are selected from the group consisting of —$(CH_2)_n$— (wherein n is an integer of 2 to 4), —$CH(CH_3)CH_2$— and —$CH_2CH_2$—O—$CH_2$—$CH_2$—, and $R_3$ is selected from the group consisting of a hydrogen atom, alkyl groups having 1 to 4 carbon atoms, and —$(CH_2)_2$—OH,
with the use of a heteropoly-acid and/or its salt as a catalyst, the amount of said polyhydric alcohol being less than 4-fold moles of the heteropoly-anion, and allowing 0.1 to 15 molecules of water per one heteropoly-anion to exist in the catalyst phase.

3. A process for producing a sulfur containing polyether polyol which comprises copolymerizing tetrahydrofuran with a polyhydroxyalkyl sulfide having the structural formula $$HO—R_1—S—R_2—OH$$

wherein $R_1$ and $R_2$ are selected from the group consisting of —$(CH_2)_n$— (wherein n is an integer of 2 to 4), —$CH(CH_3)CH_2$— and —$CH_2CH_2$—O—$CH_2CH_2$— and —$CH_2CH_2$—S—$CH_2CH_2$—,
with the use of a heteropoly-acid and/or its salt as a catalyst, the amount of said polyhydroxyalkyl sulfide being less than 4-fold moles of the heteropoly-anion, and allowing 0.1 to 15 molecules of water per one heteropoly-anion to exist in the catalyst phase.

4. A process according to claim 2, wherein the catalyst is a heteropoly-acid formed by condensation of at least one oxide selected from the group consisting of Mo, W and V and an oxy-acid of the element selected from the group consisting of P, Si, As, Ge, B, Ti, Ce and Co.

5. A process according to claim 4, wherein the heteropoly-acid is one or a mixture of two or more compounds selected from the group consisting of 12-molybdophosphoric acid, 18-molybdo-2-phosphoric acid, 9-molybdophosphoric acid, 12-tungstophosphoric acid, 18-tungsto-2-phosphoric acid, 11-molybdo-1-vanadophosphoric acid, 12-molybdotungstophosphoric acid, 6-molybdo-6-tungstophosphoric acid, 12-molybdotungstovanadophosphoric acid, 12-tungstovanadophosphoric acid, 12-molybdosilicic acid, 12-tungstosilicic acid, 12-molybdotungstosilicic acid, 12-molybdotungstovanadosilicic acid, 12-tungstoboric acid, 12-molybdoboric acid, 12-molybdo-tungstoboric acid, 12-molybdovanadoboric acid, 12-molybdotungstovanadoboric acid, 12-tungstogermanic acid and 12-tungstoarsenic acid.

6. A process according to claim 2, wherein the catalyst is a heteropoly-acid formed by condensation of at least one oxide selected from the group consisting of Mo, W and V and an oxy-acid of the element selected from the group consisting of P, Si, As, Ge, B, Ti, Ce and Co.

7. A process according to claim 6, wherein the heteropoly-acid is one or a mixture of two or more compounds selected from the group consisting of 12-molybdo-phosphoric acid, 18-molybdo-2-phosphoric acid, 9-molybdophosphoric acid, 12-tungstophosphoric acid, 18-tungsto-2-phosphoric acid, 11-molybdo-1-vanadophosphoric acid, 12-molybdotungstophosphoric acid, 6-molybdo-6-tungstophosphoric acid, 12-molybodtungstovanadophosphoric acid, 12-tungstovanadophosphoric acid, 12-molybdosilicic acid, 12-tungstosilicic acid, 12-molybdotungstosilicic acid, 12-molybdotungstovanadosilicic acid, 12-tungstoboric acid, 12-molybdoboric acid, 12-molybdo-tungstoboric acid, 12-molybdovanadoboric acid, 12-molybdotungstovanadoboric acid, 12-tungstogermanic acid and 12-tungstoarsenic acid.

* * * * *